UNITED STATES PATENT OFFICE 2,535,534

ALLYL-SUBSTITUTED 1,3,5-TRIMETHYLENE TRISULFONE

Edward Michael Evans, Tonbridge, and Harry Thurston Hookway, Waddon, Croydon, England, assignors to British Resin Products Limited, London, England, a British company No Drawing. Application April 12, 1949, Serial No. 87,135. In Great Britain July 23, 1946

15 Claims. (Cl. 260—327)

This invention is for improvements in or relating to the production of allyl derivatives and has as one object the provision of a process for the production of allyl or beta substituted allyl derivatives of 1,3,5-trimethylene trisulphone, which latter compound has the formula:

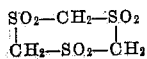

According to the present invention there is provided a process for the production of allyl derivatives which comprises reacting a halide selected from the group consisting of allyl, beta-methallyl, beta-ethallyl and propallyl halides with 1,3,5-trimethylene trisulphone in the liquid phase under alkaline conditions.

The products, which may be the mono-, di- or tri-substituted derivatives of 1,3,5 trimethylene trisulphone or mixtures of these, according to the proportions of halide and trimethylene trisulphone used, may be prepared by reacting the trimethylene trisulphone, conveniently in aqueous alcoholic alkaline solution, with the halide at temperatures which may vary from room temperature to reflux, but preferably at temperatures at which a gentle reflux is maintained, for a period of time which may extend up to several hours.

The reaction products may be recovered from the reaction mixture by acidification of the solution and, in the case of the di- and tri-substituted derivatives, may be recrystallised from any suitable solvent, conveniently from aqueous dioxane.

The following examples, in which the parts are expressed by weight, illustrate the manner in which the invention may be carried into effect.

Example 1

5 parts of trimethylene trisulphone were dissolved in 20 parts of water containing 2 parts of sodium hydroxide, and to this solution were added 1.5 parts of allyl chloride, together with sufficient 87% methylated spirits to give a homogeneous solution. The mixture was refluxed for 1 hour, and the dark red solution was left to stand overnight, the slight amount of precipitate settling out being subsequently filtered off. The filtrate was then acidified with hydrochloric acid and the yellow precipitate was filtered off and washed with much water. This precipitate was the required mono-allyltrimethylene trisulphone and was insoluble in water, diethylene glycol and dioxane.

Example 2

2.34 parts of trimethylene trisulphone were dissolved in 15 parts of water containing 1 part of sodium hydroxide. 1.53 parts of allyl chloride were then added, followed by sufficient alcohol to form a homogeneous solution. The reaction mixture was then gently refluxed for 45 minutes, allowed to cool and acidified. The resulting white precipitate, which was filtered off and dried under vacuum at 60° C., was primarily 1,3-di-allyl 1,3,5-trimethylene trisulphone, having an average of 2 double bonds per molecule and a molecular weight of 320.

Example 3

5 parts of trimethylene trisulphone were dissolved in 20 parts of water containing 2 parts of sodium hydroxide and to the solution were added 4.5 parts of allyl chloride and sufficient 87% methylated spirits to give a homogeneous solution. The mixture was refluxed for 1 hour and, on cooling, a thick, white precipitate settled out, which was filtered off and washed with water to yield 3.8 grams of the required tri-allyl derivative, melting point 260–270° C., which was insoluble in di-ethylene glycol but could be recrystalised from dioxane or 87% methylated spirits. Acidification of the filtrate with hydrochloric acid resulted in the precipitation of a further quantity of the tri-allyl derivative.

Example 4

4 parts of trimethylene trisulphone were dissolved in 20 parts of water containing 2 parts of sodium hydroxide. 1.4 parts of methallyl chloride were then added together with sufficient methylated spirits to give a homogeneous solution. The reaction mixture was refluxed for 1 hour and left to stand overnight. Acidification with hydrochloric acid then gave a buff precipitate of the mono methallyl derivative, which was filtered off, washed with water and dried on a water bath. It was insoluble in methylated spirits, di-ethylene glycol, dioxane and di-ethyl formamide.

Example 5

Example 4 was repeated, using 2.8 parts of the methallyl chloride, to give a yield of 3 parts of the di-methallyl derivative, melting point 210 to 212° C., which was soluble in, and could be recrystallised from, methylated spirits, aqueous dioxane, di-ethylene glycol and di-ethyl formamide.

Example 6

4 parts of trimethallyl trisulphone were dissolved in 20 parts of water containing 2 parts of sodium hydroxide and 4.2 parts of methallyl chloride were added together with sufficient methylated spirits to give a homogeneous solution. The reaction mixture was refluxed for 1 hour, filtered and allowed to stand overnight. The resulting cream precipitate of the trimethallyl derivative was filtered off and found to be soluble in methylated spirits, di-ethylene glycol and dioxane. It has a melting point of about 195° C.

The new compounds of the present invention differ from the known saturated alkyl trimethylene trisulphones in that they can be polymerised to give valuable resins of good acid resistance, their polymerisation being described in our co-pending application Serial No. 762,532. Thus, a 20% solution of the di-allyl derivative in di-ethylene glycol may be coated on glass and stoved at 170° C. for 1 hour to give a clear, glossy film of good acid resistance and a 10% solution of the tri-allyl derivative, di-methallyl derivative or tri-methallyl derivative may be similarly treated by stoving for 30 minutes at 170° C. to give films of good acid resistance. Alternatively, the products may be polymerised, for example, by treatment with benzoyl peroxide, to give solid resins. Thus, a solution of the methallyl derivative in di-ethylene glycol may be treated with benzoyl peroxide to give a solution of the resulting brown resin which may be used as a stoving lacquer.

Although the process of this invention has been illustrated only with respect to the allyl and methallyl derivatives, the ethallyl and propallyl derivatives may be prepared by substituting the corresponding halides in equivalent amount without significant change in procedure.

This application is a continuation-in-part of our co-pending application Serial No. 762,533, filed on July 21, 1947, now abandoned.

We claim:

1. A substituted 1,3,5-trimethylene trisulphone in which the substituting radical is selected from the group consisting of the allyl, beta-methallyl, beta-ethallyl and beta-propallyl radicals and wherein at most each methylene group is mono-substituted.

2. A mono-substituted 1,3,5-trimethylene trisulphone as set forth in claim 1.

3. A di-substituted 1,3,5-trimethylene trisulphone as set forth in claim 1.

4. A tri-substituted 1,3,5-trimethylene trisulphone as set forth in claim 1.

5. 1,3 di-allyl 1,3,5-trimethylene trisulphone.

6. 1,3,5 triallyl 1,3,5-trimethylene trisulphone.

7. 1,3 di-methallyl 1,3,5-trimethylene trisulphone.

8. A process for the production of allyl derivatives, which comprises reacting 1,3,5-trimethylene trisulphone in the liquid phase under alkaline conditions with a compound selected from the group consisting of the allyl, beta-methallyl, beta-ethallyl and beta-propallyl halides.

9. A process as set forth in claim 8, wherein said reaction is effected in an aqueous medium.

10. A process as set forth in claim 9, wherein said medium is an aqueous alcoholic medium.

11. A process as set forth in claim 10, wherein the resulting reaction medium is acidified and the precipitated reaction product then recovered.

12. A process for the production of allyl derivatives which comprises reacting 1,3,5-trimethylene trisulphone in the liquid phase under alkaline conditions with a compound selected from the group consisting of the allyl, beta-methallyl, beta-ethallyl and beta-propallyl halides, whilst maintaining the reaction gently refluxing during the course of the reaction.

13. A process as set forth in claim 12, wherein said reaction is effected in an aqueous alcoholic medium.

14. A process as set forth in claim 13, wherein the resulting reaction mixture is acidified and the precipitated reaction product is recovered.

15. A process for the production of allyl derivatives which comprises reacting allyl chloride with 1,3,5-trimethylene trisulphone in an aqueous alcoholic medium containing sodium hydroxide whilst maintaining the reaction mixture gently refluxing, and thereafter acidifying the reaction mixture and recovering the precipitated reaction product.

EDWARD MICHAEL EVANS.
HARRY THURSTON HOOKWAY.

REFERENCES CITED

The following references are of record in the file of this patent:

Camps, Chemische Berichte, 25, 243, 244 (1892).